United States Patent [19]

Saimi

[11] 4,447,722

[45] May 8, 1984

[54] OPTICAL INFORMATION READING DEVICE

[75] Inventor: Tetsuo Saimi, Hirakata, Japan

[73] Assignee: Matsushita Electric Industrial Co., Ltd., Kadoma, Japan

[21] Appl. No.: 311,901

[22] Filed: Oct. 15, 1981

[30] Foreign Application Priority Data

Oct. 17, 1980 [JP] Japan ............................ 55-146166

[51] Int. Cl.³ ............................................ H01J 40/14
[52] U.S. Cl. .................................... 250/216; 369/109; 369/45
[58] Field of Search ................ 250/201, 203 R, 216, 250/204, 570; 369/44, 45, 46, 109, 110, 111, 112, 122; 350/446

[56] References Cited

U.S. PATENT DOCUMENTS 4,264,986  4/1981  Willis .................................. 369/109
4,334,300  6/1982  Arquie et al. ........................ 369/46
4,341,953  7/1982  Sakai et al. ......................... 250/201

Primary Examiner—David C. Nelms
Assistant Examiner—J. Brophy
Attorney, Agent, or Firm—Stevens, Davis, Miller & Mosher

[57] ABSTRACT

An optical information reading device adapted to apply a light beam from a light source to an information carrier having information recorded thereon as convexities and concavities or variations in a light reflecting factor, and to receive the light reflected from the information carrier, thereby to read the information. A specific arrangement of optical elements such as a beam splitter, lens, and reflecting mirror enables the information reading device as a whole to be reduced in size particularly in length in the direction perpendicular to the plane of the information carrier.

4 Claims, 4 Drawing Figures

OPTICAL INFORMATION READING DEVICE

BACKGROUND OF THE INVENTION

The present invention relates to an optical information reading device adapted to read, by means of a light beam, information reproduced from an information carrier such as a video disc, a P.C.M. audio disc or the like carrying the information in the form of convexities and concavities or variations in a light reflection factor.

In the reproduction of recorded signals from the carrier of the type mentioned above, it is possible to reduce the size of the reproducing apparatus as a whole by the use of a radiant ray source having a minute light emitting surface such as a semiconductor laser. For further reducing the size of the apparatus, it is necessary to overcome the problem of difficulty in making the path of the light beam short.

SUMMARY OF THE INVENTION

Accordingly, an object of the invention is to provide an optical information reading device which can satisfy the demand stated above.

To this end, according to the invention, there is provided an optical information reading device comprising: a radiant ray source adapted to produce a light; a lens system for converting the light from the radiant ray source into a beam parallel to the recording surface of an information carrier; a beam splitter adapted to reflect the light beam in a direction perpendicular to the recording surface of the information carrier; an objective lens system for converging the reflected light beam on the recording surface of the information carrier; a concaved mirror adapted to reflect at least a part of the light beam relfected from the recording surface of the information carrier and passed through the objective lens system and the beam splitter toward the beam splitter; and a radiant ray detector disposed at a point where the light reflected by the concaved mirror and reflected at a right angle by the beam splitter is focussed.

The above and other objects of the invention will be understood more fully from the following description of the preferred embodiment taken in conjunction with the accompanying drawings.

DESCRIPTION OF THE PREFERRED EMBODIMENTS

The present invention will be explained in detail hereinunder in the form of preferred embodiments with reference to the accompanying drawings.

Before turning to the description of the preferred embodiments, a description will be made as to an optical information reading device proposed already by the present inventors in Japanese Patent Laid-open No. 83849, in order to facilitate understanding of the present invention. This known device can have a reduced size as compared with conventional optical information devices thanks to the use of a radiant ray source consisting of a semiconductor laser.

Figure 1:
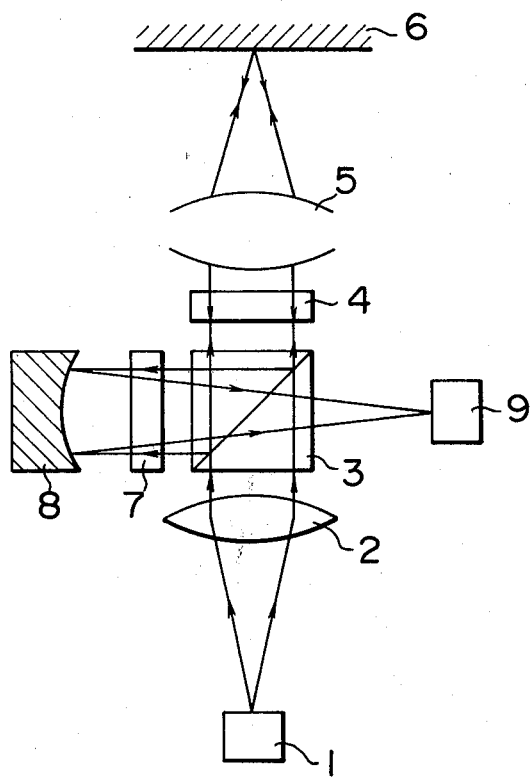
FIG. 1 shows an example of an optical information reading device proposed by the present inventors in advance to the present application.

Namely, referring to FIG. 1, a light emitted from a radiant ray source 1 consisting of a semiconductor laser is turned into a parallel light beam by means of a coupling lens 2. The parallel light beam is applied to an objective lens system 5 through a polarization beam splitter 3 and a quarter wavelength plate 4. The objective lens system 5 makes the light beam converge on an information carrier 9, so that the light beam is modulated in accordance with information recorded in the information carrier 6 and is reflected by the latter.

The light beam thus reflected is then made to pass through the objective lens system 5 and the quarter wavelength plate 4, and is then reflected by the polarization reflector at an angle of 90°. The light beam is then directed to a concaved mirror 8 through another quater wavelength plate 7. The light beam reflected by the recessed mirror 8 is made to pass through the quarter wavelength plate 7 and the polarization beam splitter 3 in a somewhat converging manner and is applied to the radiant ray detector 9. The functions of the quarter wavelength plates 4 and 7 is as follows.

The polarization beam reflector 3 permits the P polarization to pass therethrough but reflects the S polarization. The quarter wavelength plate converts the P or S polarization into a circular polarization when it is passed by the P or S polarization in one direction. However, when the light beam is made to pass through the quarter wavelength plate reciprocatingly, i.e. in one direction and then in the other direction, the polarization is converted into the other type. Namely, if the P polarization is made to pass through the quarter wavelength plate, it is converted into S polarization. Similarly, the S polarization is converted into P polarization. Therefore, if the light beam emitted from the semiconductor laser 1 is of P polarization, it is possible to minimize the loss of light in the polarization beam splitter 3 while preventing any stray beam or returning of the light beam to the semiconductor laser of the radiant ray source 1, in the arrangement shown in FIG. 1.

According to the arrangement shown in FIG. 1, it is possible to reduce the size of the optical system as a whole as compared with the conventional arrangement, but the longitudinal size cannot be reduced subsantially. More specifically, assuming here that the diameter of the beam spot on the information carrier 6 is 1 μm, that the distance between the information carrier 6 and the lens 5 is 4mm and that the size of the light emitting spot of the radiant ray source 1 is 3 μm, the distance between the lens 2 and the radiant ray source 1 is as large as 12 mm.

In FIG. 1, the reflecting mirror 8, quarter wavelength plates 4, 7 and the radiant ray detector 9 are illustrated in a somewhat exaggerated manner, and can have reduced thicknesses. It is possible even to install the whole part of the optical system in a single cylinder. Thus, the arrangement shown in FIG. 1 is suitable for a system in which the whole part of the optical system is moved three-dimensionally to achieve a focussing servo for maintaining a constant distance between the information carrier and the objective lens system, tracking servo for tracking up the information track in the information carrier and a time-axis correction servo for correcting the information signal in relation to the time axis.

It is conceiveable that the integration of the optical system as a whole causes some inconveniences concerning the handling of the optical elements because of much reduced sizes of the optical elements.

In view of this fact, the present invention aims at providing a small-sized optical system suitable for use in a system in which focussing servo, tracking servo and time-axis correction servo are achieved by a three-dimensional movement of the objective lens system.

Figure 2:
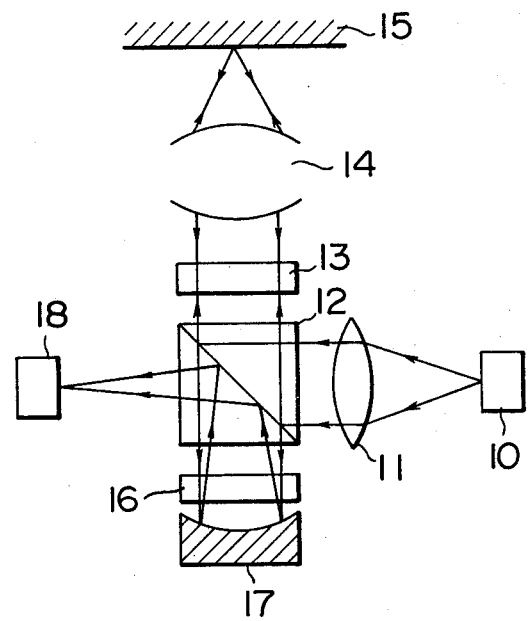
FIG. 2 is an illustration of an optical information reading device constructed in accordance with an embodiment of the invention.

A preferred embodiment of the invention will be described hereinunder with reference to FIG. 2. A light beam emitted from a radiant ray source 10 such as a semiconductor laser is changed into a parallel beam parallel to the surface of the information carrier, by means of a coupling lens 11. The parallel beam is reflected by a polarization beam splitter 12, and is converged on the information carrier 15 through a quarter wavelength plate 13 and an objective lens system 14. The light beam modulated and reflected in accordance with the information signal in the information carrier is then applied to a reflecting mirror 17, through the objective lens system 14, the quarter wavelength plate 13, the polarization beam splitter 12 and another quarter wavelength plate 16.

Assuming that the reflecting mirror 17 is a concaved mirror, the light reflected by the mirror 17 passes again through the quarter wavelength plate 16 and is applied to the polarization beam splitter 12 which now acts to reflect the light beam to direct the latter toward a radiant ray detector 18. In this optical system, there are considerably long distances between the radiant ray source 10 and the polarization beam splitter 12 and between the polarization beam splitter 12 and the radiant ray detector 18. On the other hand, the thicknesses of the quarter wavelength plate 16 and the reflecting mirror 17 can be reduced. In consequence, it is possible to obtain a small-sized optical system with a reduced height. This advantageously facilitates the installation of the optical system as a unit in a player. Namely, in general, an industrial bottleneck in reducing the size of the player is the difficulty in reducing the height of the optical system. To the contrary, if the optical system is arranged in a planar form, a large installation area is required for the installation of the optical system.

Another advantage derived from the present invention is an easy adjustment of the optical system unit. Usually, once the optical system unit is mounted in a player or the like device, the adjustment of the optical system unit is usually made by opening a rear lid of the player. According to the invention, the reflecting mirror 17 is positioned at the rear side of the player. By adjusting this reflecting mirror 17, it is possible to easily correct the optical system to make the light beam easily focussed on the radiant ray detector 18.

The optical system in accordance with the invention is suitable for a system in which focussing servo, tracking servo and time-axis correction servo are performed by a three-dimensional movement of the objective lens. Obviously,, by constructing the optical system of the invention as a unit movable three-dimensionally, it is possible to acheive the above-described three-directional servo.

According to the invention, the signals for the focussing servo and tracking servo can be obtained through known methods. For instance, it is possible to realize an asymmetric distribution of light beam on the radiant ray detector by inserting a light beam asymmetry element between the reflecting mirror and the polarization beam splitter. By making use of such an asymmetry, it is possible to easily obtain the focussing servo signal.

Figure 3:
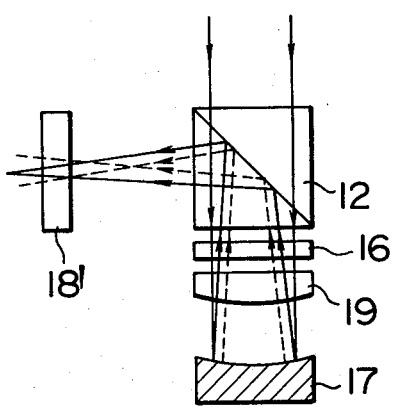
FIGS. 3 and 4 are illustrations of different embodiments of the invention.
Figure 4:
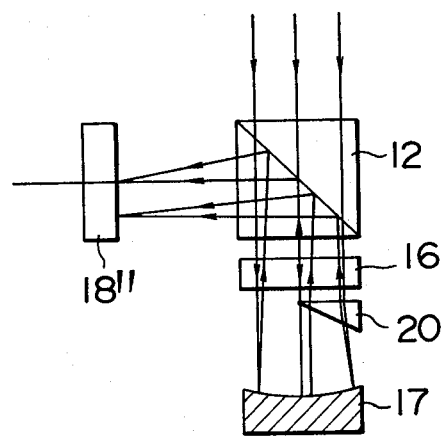

In another embodiment shown in FIG. 3, a cylindrical lens 19 is used as the asymmetric element, while a quadrant photo-detector 18' is used as the radiant ray detector. By so doing, it is possible to obtain a focussing servo signal by making use of an astigmatism of light on the radiant ray detector.

In still another embodiment shown in FIG. 3, a triangular prism 20 is used as the asymmetric element. In this case, a focussing servo signal using a method referred to as the "Foucault method" or "knife edge method" can be derived from a split type photo-detector 18. It is also possible to easily obtain a tracking servo signal by arranging the triangular prism 20 in such that its one end surface extends in parallel with the information track.

As will be understood from the foregoing description, the present invention makes it possible to reduce the vertical length (length in the direction perpendicular to the plane of the information carrier) of the optical system as compared with the known arrangement shown in FIG. 1. In addition, it is easy to access for adjustment the reflecting mirror located at the lowermost portion of the device, from the bottom side of the device, to facilitate the adjustment of the optical system.

Although the invention has been described with specific terms, the described embodiments are only illustrative and various changes and modifications may be imparted thereto without departing from the scope of the invention which is limited solely by the appended claims.

What is claimed is:

1. An optical information reading device comprising: a light beam source for producing a light beam which irradiates a recording surface of an information carrier; a light beam detector for detecting the light beam reflected from the recording surface of said information carrier; a lens system for converting the light beam from said light beam source into a collimated light beam parallel to the recording surface of said information carrier; a beam splitter adapted to reflect the light beam from said light beam source in a direction perpendicular to the recording surface of said information carrier but to allow the light reflected from the recording surface of said information carrier to pass therethrough; an objective lens system for converging the light beam reflected from said beam splitter on said recording surface of said information carrier; and means for reflecting toward said beam splitter at least a part of the light beam reflected from said recording surface of said information carrier and passed through said objective lens system and said beam splitter, and for focussing the thus obtained light beam on said detector through said beam splitter which reflects said thus obtained light beam at a right angle.

2. An optical information reading device as claimed in claim 1, further comprising quarter wavelength plates disposed at the side of said beam splitter adjacent to said objective lens system and at the side of the same adjacent to said reflecting means.

3. An optical information device as set forth in claim 1, wherein said reflecting and focussing means comprises a concave mirror.

4. An optical information device as set forth in claim 1, wherein said reflecting and focussing means comprises a convex lens and a plane mirror.

* * * * *